(12) United States Patent
Studer

(10) Patent No.: US 7,387,652 B2
(45) Date of Patent: Jun. 17, 2008

(54) EMERGENCY BIO-FILTER

(76) Inventor: Ronald M. Studer, 1820 E. Mansfield St., Bucyrus, OH (US) 44820

( * ) Notice: Subject to any disclaimer, the term of this patent is extended or adjusted under 35 U.S.C. 154(b) by 372 days.

(21) Appl. No.: 10/966,014

(22) Filed: Oct. 15, 2004

(65) Prior Publication Data

US 2008/0053047 A1 Mar. 6, 2008

Related U.S. Application Data

(60) Provisional application No. 60/511,471, filed on Oct. 15, 2003.

(51) Int. Cl.
*B01D 39/00* (2006.01)
(52) U.S. Cl. .................. 55/338; 55/339; 55/340; 55/356; 55/467; 55/472
(58) Field of Classification Search ................ 55/338, 55/339, 340, 356, 418, 467, 471, 472, 385.3
See application file for complete search history.

(56) References Cited

U.S. PATENT DOCUMENTS

| 4,191,543 | A | * | 3/1980 | Peters ......................... 96/223 |
| 4,784,675 | A | * | 11/1988 | Leber et al. ................... 96/110 |
| 5,240,478 | A | * | 8/1993 | Messina ....................... 95/273 |
| 5,331,991 | A | * | 7/1994 | Nilsson ........................ 135/93 |
| 5,399,319 | A | * | 3/1995 | Schoenberger et al. ....... 96/224 |
| 5,665,128 | A | * | 9/1997 | Peters et al. .................. 96/399 |
| 5,761,908 | A | * | 6/1998 | Oas et al. ..................... 62/3.2 |
| 6,783,578 | B2 | * | 8/2004 | Tillman, Jr. .................. 96/224 |
| 2003/0101700 | A1 | * | 6/2003 | Burdine et al. ............. 55/385.2 |

FOREIGN PATENT DOCUMENTS

KR 200292058 A * 6/2001

* cited by examiner

*Primary Examiner*—Duane Smith
*Assistant Examiner*—Sonji Turner
(74) *Attorney, Agent, or Firm*—Pearne & Gordon LLP

(57) ABSTRACT

A portable filter assembly for providing filtered air to an enclosed space includes a housing having an exhaust port connected to the enclosed space, an internal air intake port connected to the enclosed space, and an external air intake port connected to the outside of the enclosed space. A fan provides a partial vacuum to the internal and external air intake ports. A filter is located in the housing and the assembly is arranged such that the assembly simultaneously filters re-circulated air from the enclosed space through the internal air intake port and filters external air from the outside of the enclosed space through the external air intake port and filters the air to the enclosed space through the exhaust port.

21 Claims, 5 Drawing Sheets

EMERGENCY BIO-FILTER

This application claims the benefit of U.S. Provisional Patent Application No. 60/511,471 filed Oct. 15, 2003, the contents which are herein incorporated by reference.

FIELD OF INVENTION

The present invention relates to an air filtering system and more specifically to an improved air filtering system capable re-circulating internal air and introducing external air to create a positive pressure in a room.

BACKGROUND OF THE INVENTION

Due to the growing concerns regarding potential biological or chemical terrorist attacks, a need exists in the state of the art for an inexpensive and simple-to-use filter which could effectively remove dangerous contaminated particles from the air within an enclosed space, such as a room in a home, a school class room, an office, and a vehicle, for example, while simultaneously providing a positive pressure within the enclosed space sufficient to prevent migration of the contaminated particles through small cracks or openings that may be present between the enclosed space and outside of the space.

Duct tape and plastic sheeting covering doors and windows provide some protection from airborne contaminants; however, such measures will not provide an airtight seal for particles as small as about 1.0 micron in diameter (about the size of an anthrax spore, for example)). Thus, creating a positive pressure within the enclosed space, in accordance with the present invention, minimizes the introduction of such contaminants into the enclosed space.

BRIEF SUMMARY OF THE INVENTION

In accordance with one aspect of the present invention a filter assembly is provided for filtering air to an enclosed space where the filter assembly comprises a housing that includes an exhaust port connected to the enclosed space, an internal air intake port for connecting to the enclosed space, and an external air intake port for connecting outside of the enclosed space. A fan provides a partial vacuum to the intake ports and a filter is positioned within said housing, wherein the assembly is arranged such that the assembly simultaneously filters re-circulated air from the enclosed space via the internal air intake port and filters external air from the outside of the enclosed space via the external air intake port, and wherein the filtered air is provided to the enclosed space via the exhaust port.

In accordance with another aspect of the present invention, a portable filter assembly for providing filtered air to an enclosed space is provided where the filter assembly includes a housing having an exhaust port connected to the enclosed space, an internal air intake port for connecting to the enclosed space, and an external air intake port for connecting outside of the enclosed space. A fan provides a partial vacuum to the intake ports. A filter is positioned within the housing, wherein the assembly is arranged such that the assembly simultaneously filters re-circulated air from the enclosed space via the internal air intake port and filters external air from the outside of the enclosed space via the external air intake port, and where the filtered air is provided to the enclosed space via the exhaust port, and further where the assembly is portable such that the assembly can be moved into and out of the enclosed space by an individual.

In accordance with yet another aspect of the present invention, a portable filter assembly for providing filtered air to an enclosed space is provided where the filter assembly comprises, a housing having an exhaust port for connecting to the enclosed space, an internal air intake port for connecting to the enclosed space, and an external air intake port for connecting outside of the enclosed space. A fan for providing a partial vacuum to one or both of the intake ports is provided and a filter is positioned within the housing. The assembly is adapted for simultaneously filtering re-circulated air from the enclosed space through the internal air intake port and filtering external air from outside of the enclosed space through the external air intake port and filters the air to the enclosed space through the exhaust port. The filter assembly also provides a positive pressure to the enclosed space for reducing an amount of air leaking into the enclosed space from the outside of the enclosed space. The assembly is portable such that the assembly can be moved into and out of the enclosed space by an individual.

In accordance with yet another aspect of the present invention, a portable filter assembly for providing filtered air to an enclosed space is provided where the filter assembly comprises a housing having a partition forming a filter chamber and an exhaust chamber within the housing where the partition has an opening for connecting the filter chamber to the exhaust chamber, an exhaust port connecting the exhaust chamber to the enclosed space, an internal air intake port connecting the filter chamber to the enclosed space, and an external air intake port connecting the filter chamber to the outside of the enclosed space. A means is provided to provide a partial vacuum within the filter chamber and a filter is positioned within the filter chamber. A baffle for controlling the amount of airflow of one or both of the re-circulated air and external air entering the filter is provided. The assembly is arranged such that the assembly filters re-circulated air from the enclosed space through the internal air intake port and filters external air from the outside of the enclosed space through the external air intake port and filtered air is provided to the enclosed space through the exhaust port. The filter assembly also provides a positive pressure to the enclosed space for reducing an amount of air leaking into the enclosed space from the outside of the enclosed space. The assembly is portable such that said assembly can be moved into and out of said enclosed space by an individual.

DESCRIPTION OF THE PREFERRED EMBODIMENTS

The invention provides a bio-filter assembly for filtering the air of an enclosed space, such as an enclosed room, for example, and for providing a positive air pressure in the enclosed space in order to prevent contaminated air from entering the space from outside the enclosed space.

Figure 1:
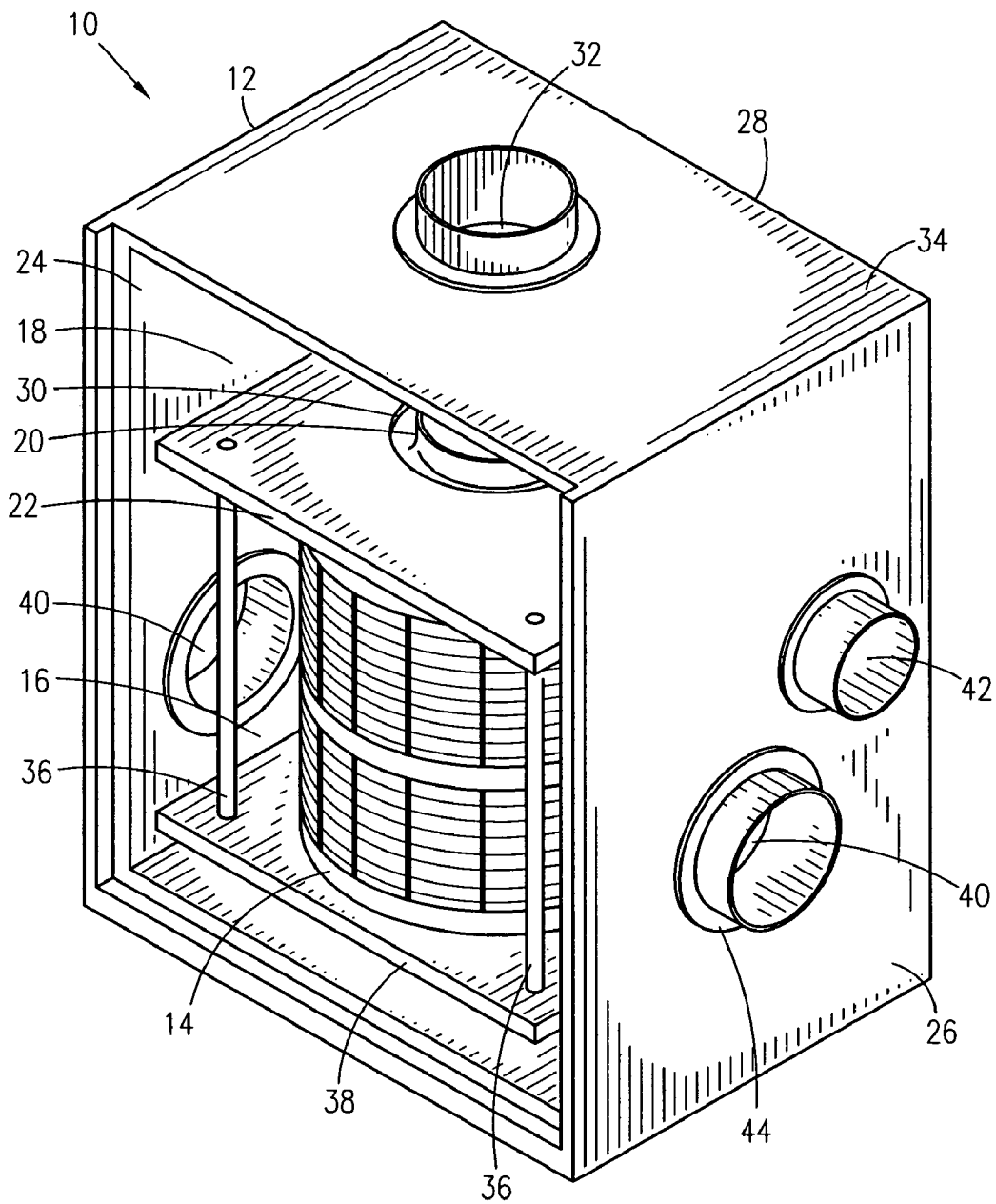
FIG. 1 is a perspective view of one embodiment showing the location of a purification filter according to the present invention.
Figure 2:
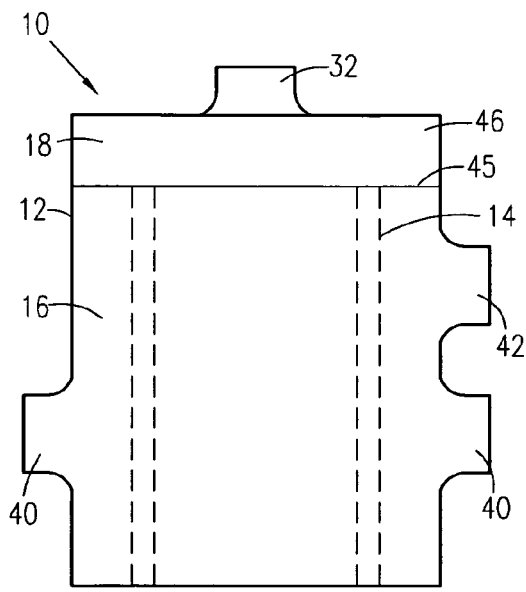
FIG. 2 is a front view of another embodiment according to the present invention utilizing a molded plastic housing with integral air intake and exhaust ports.
Figure 3:
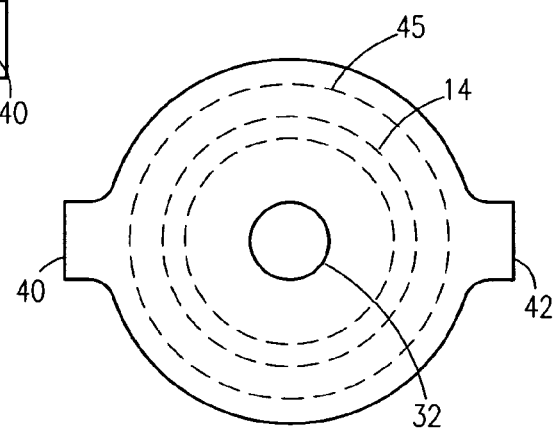
FIG. 3 is a top view of FIG. 2.

Referring now to the drawings, which are for purposes of illustrating an example of the invention only and not for purposes of limiting the same, FIG. 1 shows a first embodiment of a bio-filter assembly 10 in accordance with the present invention. The bio-filter assembly 10 includes an enclosure 12, and a purification filter 14. In regard to all embodiments described below the enclosure 12 may be constructed of any suitable material known in the art that provides a rigid, leak tight enclosure such as wood, metal, plastic, fiberglass, etc. Further, the purification filter 14 can be any suitable type of filter commonly known in the art, such as high efficiency particulates air (HEPA) filter, an air filter similar to that of an automotive carburetor filter, an oil filter, a charcoal filter, etc. for filtering out small particles of dust and biological matter. A motor 54, shown in the third embodiment, drives a fan thus creating a vacuum in the enclosure 12 as will be described below. The motor may be any type of motor known in the art. The motor can be electrically powered, for example, by any conventional means such as known in the art such as a DC or an AC source, a solar source, a battery source, etc. Furthermore, the fan may be driven by any other means known in the art such as, for example, a winding device.

Referring now to FIG. 1, a panel of the enclosure 12, preferably a front panel is removable to allow installation of the purification filter 14. The enclosure 12, along with partition 22, forms a first and second chamber. The first chamber houses the purification filter 14 and is referred to as the filter chamber 16. The second chamber, located adjacent to the filter chamber 16, is an exhaust chamber 18 that houses an exhaust duct 20. The partition 22 separates the chambers 16, 18 and is securely attached to the sidewalls 24, 26 and back wall 28 of the enclosure 12. The partition 22 further forms an opening 30 to allow the exhaust duct 20 to extend from the top of the purification filter 14 into the exhaust chamber 18 and out through an exhaust port 32 located on top 34 of the enclosure 12. The size of the exhaust port 32 can be any suitable size to allow adequate airflow out of the purification filter 14. Furthermore, the exhaust port 32 can be tied into any existing vent that vents air outside of the enclosed space, such as a dryer vent.

In the embodiment shown in FIG. 1 the exhaust port 32 has a diameter of about eight inches. It should be noted that it is not necessary to have a single exhaust port exhausting the air out of the top of the enclosure. For example, the air can be exhausted out of any of the four walls or the top by using a single or multiple exhaust ports.

The partition 22 also serves as a means of supporting the purification filter 14. Support rods 36 are attached to the partition 22 by any means known in the art, such as screws, bolts, glue, etc., for example, and extend from the partition 22 to a support platform 38. The support rods 36 are also attached to the to the support platform 38 in the same or similar manner that they are attached to the partition 22. As shown in FIG. 1, the purification filter 14 sits on the support platform 38. The support platform 38 can be made to adjust vertically to accommodate different sized purification filters 14.

The enclosure 12 further includes one or more openings or air intake ports to introduce internal and/or external air into the bio-filter assembly. The embodiment shown in FIG. 1 includes two internal air intake ports 40 for re-circulating air from within an enclosed room, for example, and one external air intake port 42 for introducing air outside the enclosed room into the enclosed room. Thus, bio-filter assembly 10 can simultaneously re-circulate air internal to the room and introduce external air as well. By re-circulating internal air, the air can be further filtered and cleaned, whereas the introduction of external air into the room via the bio-filter assembly 10 creates a positive pressure within the enclosed room thereby preventing contaminated particles via external air from entering the enclosed space.

The air intake ports 40, 42 are positioned such that the air entering through any given air intake port 40, 42 enters the filter chamber 16 and travels through the purification filter 14 before being exhausted into the enclosed room. The air intake ports 40, 42 can be any suitable size to provide an adequate flow of air into the bio-filter assembly 10. In the embodiment shown in FIG. 1 the internal air intake ports 40 have a diameter of about six inches and the external air intake port 42 has a diameter of about four inches.

The bio-filter assembly 10 may include a sealing means such as a ductwork collar 44 to seal the air intake 40, 42 and exhaust 32 ports to the enclosure 12 to provide an airtight connection to external ductwork.

FIGS. 2-7 show variations of a second embodiment in accordance with the present invention. In this embodiment the enclosure 12 is preferably made of a formable material, such as plastic, for example, where the air intake ports 40, 42 and the exhaust port 32 are an integral part of the enclosure 12 thus reducing manufacturing costs. In addition, the integrated design provides a more reliable leak tight seal with the external ductwork.

In the bio-filter assemblies 10 in FIGS. 2-5, a lip 45 is circumferentially formed around an upper portion 46 of the enclosure 12. When the purification filter 14 is installed into the enclosure, the top of the purification filter 14 comes into contact with the lip 46 thereby forming a seal and thus providing a filter chamber 16 below the seal and an exhaust chamber 18 above the seal. Therefore, the air, whether external or internal, enters the filter chamber 16, and then travels through the purification filter 14 before being exhausted into the enclosed room. The integrated seal design further reduces manufacturing costs.

Figure 4:
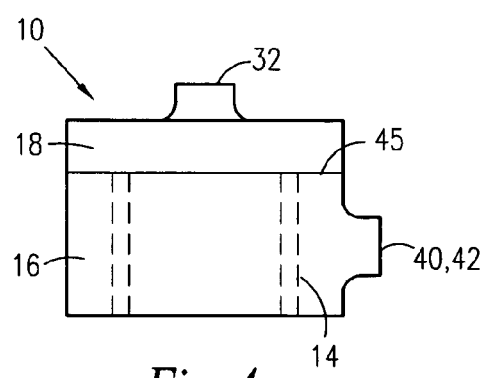
FIG. 4 is a front view of a compact design of the embodiment of FIG. 2.
Figure 5:
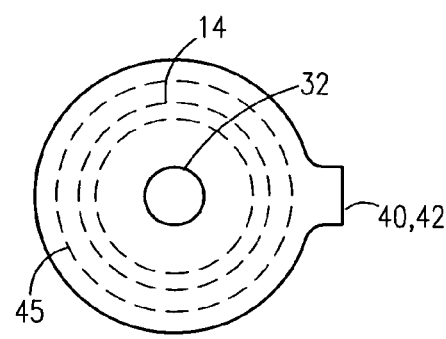
FIG. 5 is a top view of FIG. 4.

FIGS. 4 and 5 further show a compact design suitable for use during travel. The compact design allows the user to carry the bio-filter assembly 10 where ever he or she may travel. Thus, the bio-filter assembly 10 can be used in an automobile, for example, or can be easily transported for use in an enclosed space other than the users residence, such as a hotel room, tent, etc. The compact design may be achieved by any one, or a combination of several, means. First, as shown in FIG. 4, the bio-filter assembly 10 can be provided with a single air intake port 40, 42 to save space. The air intake port may be utilized as either an internal air intake port 40 or an external air intake port 42, as desired. Thus, by reducing the number of air intake ports, the height and the width of the enclosure 12 may be reduced.

Second, the size of the purification filter 14 may be reduced. Because filters are made in various sizes, a smaller filter design may be used to facilitate the compactness of the design.

Third, the size of the motor that pumps air through the bio filter assembly 10 may be reduced, such as by using a lower capacity or more efficient motor, for example. One embodiment might utilize a small internal combustion motor rather than an electric motor for ease of transportability, for example.

Figure 6:
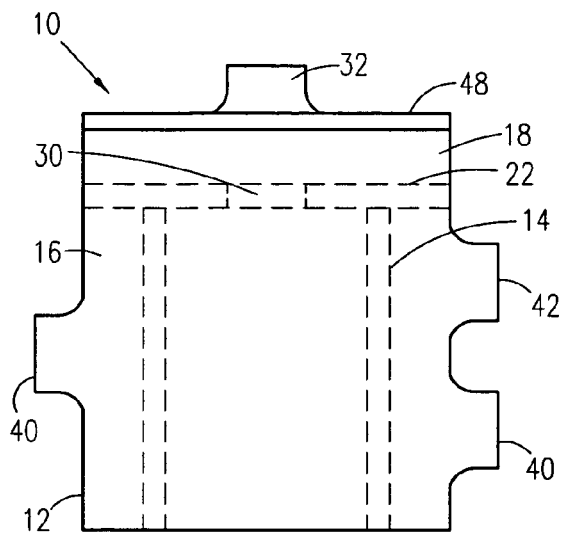
FIG. 6 is a front view of the embodiment of FIG. 2 having a removable top.
Figure 7:
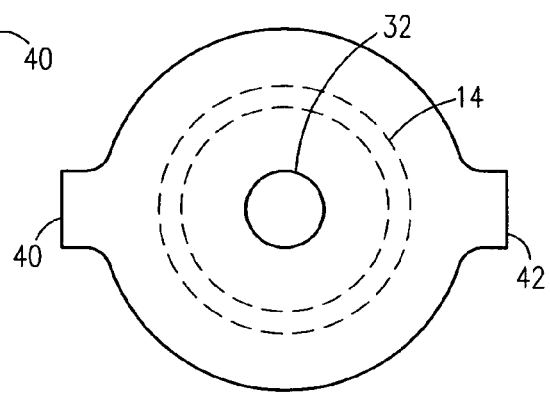
FIG. 7 is a top view of FIG. 6.

Optionally, the bio-filter assembly 10 shown in FIGS. 6 and 7 includes a removable lid 48 similar to that of a lid used on a two-gallon bucket, for example. As in FIGS. 2-5, the air intake ports 40, 42 are preferably an integrated portion of the enclosure 12 for the portable unit. Further, the exhaust port 32 can be made an integrated portion of the removable lid 48. The removable lid 48 can be attached-to the top of the enclosure 12 by any suitable means known in the art, such as snapping, screwing, fastening using hooks and loops, etc., for example. Preferably, the removable lid 48 can be attached to the enclosure 12 by snapping the removable lid 48 to the top of the enclosure 12.

As shown in FIGS. 1 and 6, the bio-filter assembly 10 further includes the partition 22. The partition 22 may be positioned in the upper portion 46 of the enclosure 12 above the purification filter 14 to thus create the filter chamber 16 and the exhaust chamber 18. The partition 22 may be attached to the inside of the enclosure 12 by any means known in the art such as snapping, screwing, etc., for example. The partition 22 further includes an opening 30 to allow the exhaust duct 20 to extend from the top of the purification filter 14 through the exhaust chamber 18 and out the top of the enclosure 12.

FIGS. 8-15 show variations of a third embodiment of a bio-filter assembly 50 in accordance with the present invention. As in the above-mentioned embodiments, the bio-filter assembly 50, for example, includes an enclosure 52, a motor 54 with a motor housing 54a that forms an exhaust chamber 54b, a first purification filter 56, an exhaust port 60, multiple internal air intake ports 62, and an external air intake port 64.

The bio-filter assembly 50 further includes a filter chamber 53 that houses the purification filter 56 and a second filter chamber 55 that can house a second purification filter, as will be described below. Furthermore, as an option, multiple pre-filters may be added to facilitate the air purification process. It should be noted that any number of pre-filters can be added to the bio-filter assembly 10 to facilitate the air purification process that will be subsequently described.

Figure 8:
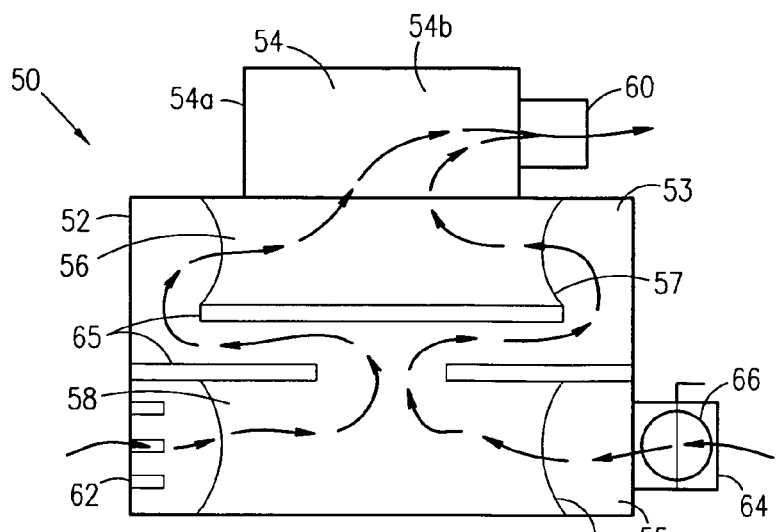
FIG. 8 is a side view of another embodiment according to the present invention where the external air intake port incorporates a baffle.

Referring to FIG. 8, a second purification filter 58 can also be added and may be positioned adjacent to the first purification filter 56. Thus, the incoming air will travel through the second purification filter 58 first before it passes through the first purification filter 56. The second air filter 58 is designed to remove larger particles of debris from the air prior to reaching the first purification filter 56, thereby extending the life and utility of the first purification filter 56.

In addition, a first pre-filter 57 may be added and positioned around the first purification filter 56. Accordingly, any air traveling through the bio-filter assembly 10 will first travel through the first pre-filter 57 prior to passing through the first purification filter 56. The first pre-filter 57 may be any type of air purification filter known in the art such as a charcoal filter, for example. During the air filtration process, the first pre-filter 57 absorbs organic vapors and controls odor thereby extending the life of the first purification filter 56.

Furthermore, a second pre-filter 59 may be positioned around the second purification filter 58 to filter organic vapors from entering the second purification filter 58 thus extending the life of the second purification filter 58. Therefore, as illustrated above, any number of filters and pre-filters can be utilized to improve the air purification process and extend the life of the first purification filter 56.

The enclosure 52 can further include seal panels 65 that secure the first 56 and second 58 purification filters in place. The bottom of the first purification filter 56 and the top of the second purification filter 58 are attached to the seal panels 65 such that an airtight seal is formed around the outer edge of the filters 56, 58. An airtight seal is also formed between the enclosure 52 and the top outer edge of the first purification filter 56 and the bottom outer edge of the second purification filter 58. The seals prevent any leakage of air that would result in the introduction of contaminated particles into the enclosed space and thereby result in a loss of efficiency of the bio-filter assembly 50.

Still referring to FIG. 8, the bio-filter assembly 50 can further include a baffle 66 positioned inside the external air intake port 64. The baffle 66 allows the user to monitor or control the amount of external air that is introduced into the enclosed space. Thus, if the user wants more external air introduced into the enclosed space, the user simply opens the baffle 66. Conversely, if the user want less external air introduced into the enclosed space, the user simply closes the baffle 66. The baffle 66 can be controlled either manually or automatically by a mechanical or electrical means. It should be noted that a baffle, louver, etc. can also be attached to the internal air intake port 62. Thus, the bio-filter assembly 50 can have one or multiple baffles, louvers, etc. incorporated in the design, for example.

Referring again to FIG. 8, the operation of the bio-filter 50 will now be described. Once the bio-filter assembly 50 has been installed in a desired location and all external ductwork is installed, the user switches the motor 54 to the on position. The motor 54 drives a fan which pumps air out of the enclosure 52 thus creating a partial vacuum in the enclosure 52. The vacuum causes air to be drawn into the enclosure 52 simultaneously through the internal air intake ports 62 and the external air intake port 64. Referring to the arrows shown in FIG. 8, for that embodiment, the air travels in the following path: 1) through the second pre-filter 59, 2) through the second purification filter 58, 3) around the seal panels 65, 4) through the first pre-filter 57, 5) through the first purification filter 56, 6) into the motor housing 55, and 7) out through the exhaust port 60 into the enclosed space.

Thus, in that embodiment the air travels through two pre-filters 57, 59, a second purification filter 58, and a first purification filter 56 prior to entering the enclosed space. During operation of the bio-filter assembly 50 the user can adjust the baffle 66 to increase or decrease the amount of airflow into the enclosed space. Furthermore, because air is being drawn into the enclosure 52 through both the internal air intake port 62 and the external air intake port 64, the bio-filter assembly 50 is simultaneously filtering, and thus cleaning, the internal enclosed space air and preventing contaminants from entering the enclosed space by creating a positive pressure in the enclosed space.

In the event of a power outage, the embodiment shown in FIG. 8 can still provide filtered air into the enclosed space providing the bio-filter assembly is equipped with a baffle or louver on the internal air intake port 62. Under these circumstances, the user simply closes the baffle or louver on the internal air intake port 62 and if the enclosed space is at a negative pressure air will enter through the external air intake port 64 travel its normal path and enter the enclosed space through the exhaust port 60. The baffle can also be used to increase the amount of external air added to the room by limiting the recirculation of internal air.

FIGS. 9-15 are variations of the embodiment described in FIG. 8 and operate in a similar manner and will be only briefly described.

Figure 9:
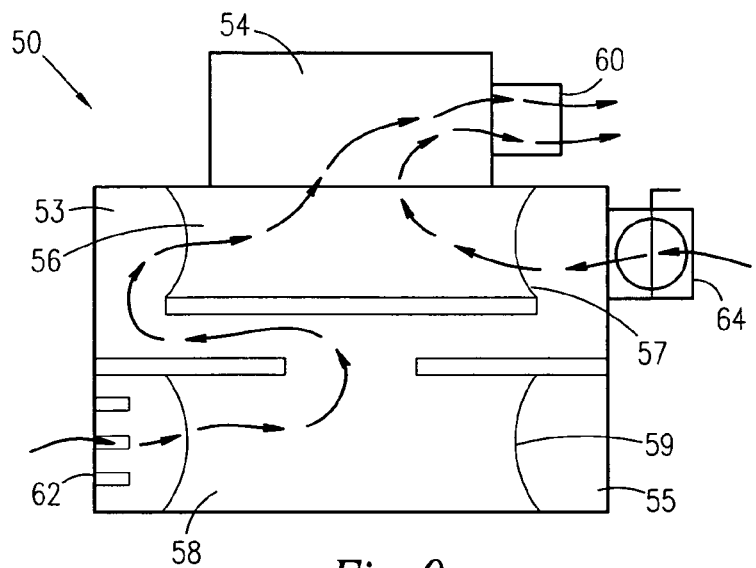
FIG. 9 is a side view of an alternate option of the embodiment of FIG. 8 where the internal air intake port and external air intake port utilize separate chambers.

As an option, FIG. 9 shows the external air intake port 64 positioned adjacent to the filter chamber 53. Thus, the external air enters the enclosure through the filter chamber 53.

Figure 10:
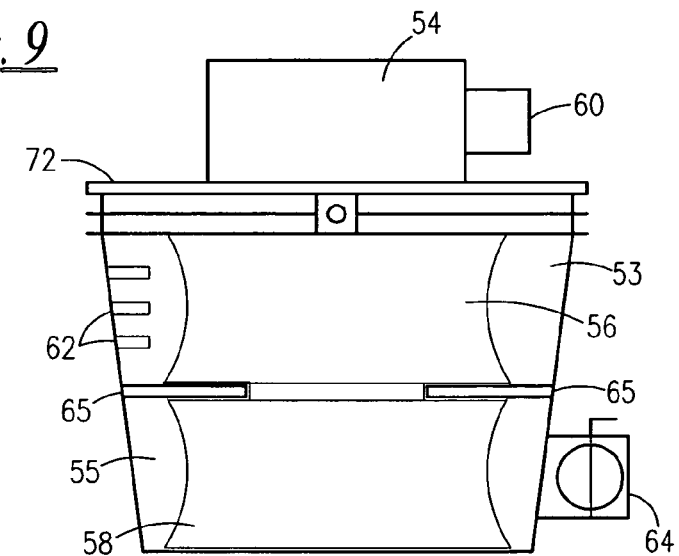
FIG. 10 is a side view of an alternative option of the embodiment shown in FIG. 8 having a removable lid.

FIG. 10 shows an alternate embodiment where the bio-filter assembly 50 has been adapted for installation in a plastic bucket. This embodiment includes a removable lid 72 for ease in installation and removal of the first 56 and second 58 purification filters and the pre-filters 57, 59. Further, as another option the internal air intake port 62 is adjacent to the first filter chamber 53, and the external air intake port 64 is adjacent to the second filter chamber 55. Operation of this embodiment is similar to operation of the embodiment shown in FIG. 9.

Figure 11:
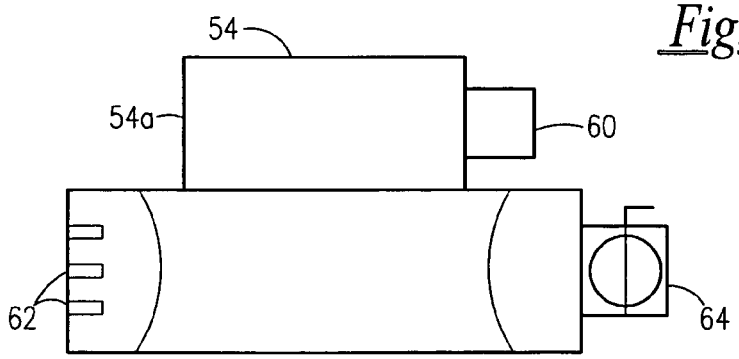
FIG. 11 is a side view of a compact design of the embodiment of FIG. 8 where a first purification filter is positioned inside a second purification filter.
Figure 12:
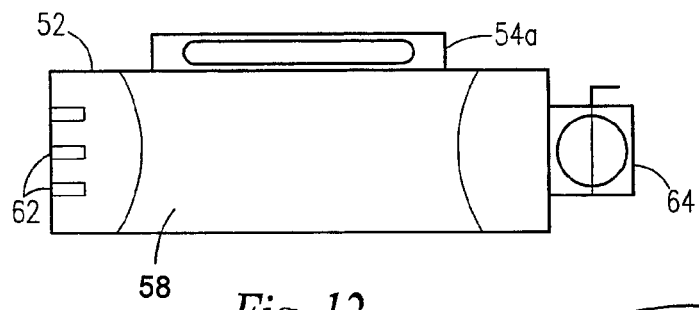
FIG. 12 is a side view of a compact design of the embodiment of FIG. 8 where the motor is placed inside a first purification filter.
Figure 13:
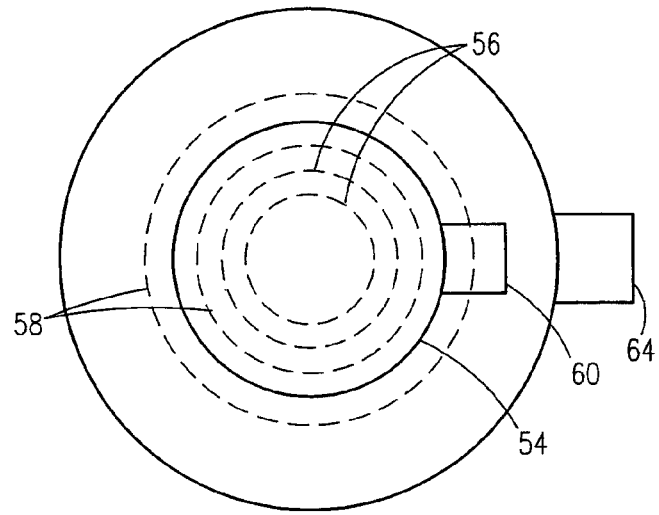
FIG. 13 is a top view of FIG. 10.

FIGS. 11 and 12 show two compact options where the second filter chamber 55 has been eliminated. In both of these options, the first purification filter 56 is positioned inside the second air filter 58 as shown in FIG. 13. Thus, any air entering the enclosure 52 still enters the second purification filter 58 prior to entering the first purification filter 56. Furthermore, the size of the bio-filter assembly 50 shown in FIG. 12 is further reduced by positioning the motor 54 such that part or all of the motor is placed inside the first purification filter 56. This in turn reduces the height of the motor housing 54a thus reducing the overall height of the enclosure 52.

Figure 14:
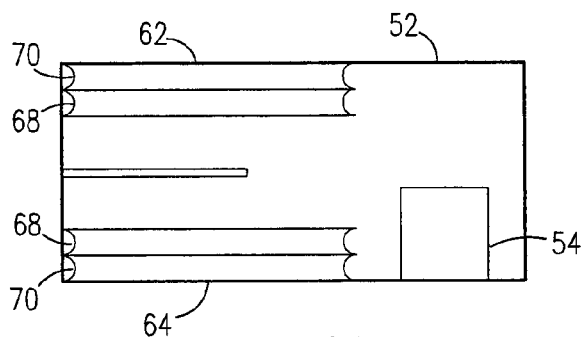
FIG. 14 is a top view according to the present invention utilizing flat purification filters.

FIG. 14 shows an option using a first flat purification filter 68 and a second flat second air filter 70. In this option, a first 68 and a second 70 flat purification filters are positioned adjacent to both the internal air intake port 62 and the external air intake port 64. Operation is the same as the embodiment shown in FIG. 8 in that both internal and external air travels through the second purification filter 70 then through the first purification filter 68 before being exhausted into the enclosed space. This configuration can function as a window-mounted unit.

Figure 15:
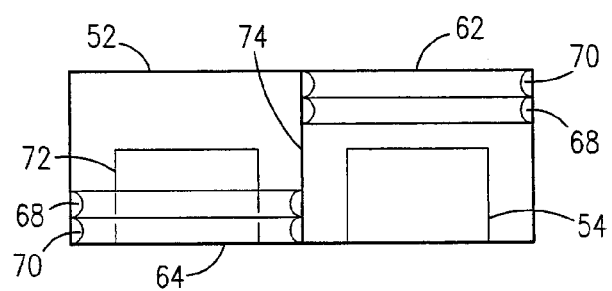
FIG. 15 is a top view of an alternative option of FIG. 14 utilizing one motor for the internal air intake port and one motor for the external air intake port.

FIG. 15 is similar to FIG. 14, except the bio-filter assembly includes a second motor 72. Thus, one motor 54 recirculates the internal air through a one set of first 68 and second 70 purification filters and the second motor 72 introduces external air into the enclosed space through an additional set of first 68 and second 70 purification filters. A partition 74 seals the motors and the filters from each other thus preventing any unfiltered air from entering the enclosed space. This embodiment allows more control over the internal/external airflows.

It should be noted that the present invention can be sized to accommodate any sized application. The first and second purification filters, and pre-filters can be stacked in an arrangement so as to provide adequate air filtration for any application not disclosed herein. For example, larger rooms or whole buildings can be supported by stacking numerous purification filters (and, if desired, pre-filters) in a drum, for example, and arranging a large motor to drive the system in a manner described herein. In larger room applications any cracks or leaks may need to be sealed off for efficiency.

Furthermore, in a preferred embodiment the present invention can be made to any particular size so as to accommodate portability. By the term portable it is meant that one person can easily disconnect the external ductwork, if applicable, move the bio-filter assembly from one room to another room and reconnect to external ductwork.

While specific embodiments of the invention have been described and illustrated, it is to be understood that these embodiments are provided by way of example only and that the invention is not to be construed as being limited thereto but only by proper scope of the following claims.

What is claimed is:

1. A filter assembly for providing filtered air to an enclosed space for a human occupant, said filter assembly comprising:
   a housing having:
      an exhaust port for connecting to the enclosed space,
      an internal air intake port for connecting to the enclosed space, and
      an external air intake port for connecting outside of the enclosed space;
   means for providing a partial vacuum to said air intake ports, said means including a motor;
   a pre-filter; and
   a purification filter within said housing,
   wherein said filter assembly is arranged such that said filter assembly is adapted for simultaneously filtering recirculated air drawn from said enclosed space via said internal air intake port and filtering external air from the outside of the enclosed space via said external air intake port, wherein
   said filtered air is provided to the enclosed space via said exhaust port, wherein
   the motor pulls a stream of air through said air intake ports, the prefilter and the purification filter and pushes the stream of air through the exhaust port, said stream of air providing a positive pressure to the enclosed space relative to the outside of the enclosed space, and wherein
   the motor is located downstream of the purification filter, and the purification filter is located downstream of the pre-filter.

2. The filter assembly of claim 1, wherein said purification filter is a HEPA filter.

3. The filter assembly of claim 1, wherein said assembly is portable such that said assembly can be moved into and out of said enclosed space by an individual.

4. The filter assembly of claim 1, wherein the housing further comprises a partition forming a filter chamber and an exhaust chamber within said housing, said partition having an opening for connecting said filter chamber to said exhaust chamber.

5. The filter assembly of claim 1, wherein said external air intake port is connected to the outside of the enclosed space via a window into the enclosed space.

6. The filter assembly of claim 1, further comprising another purification filter.

7. The filter assembly of claim 1 further comprising a baffle for controlling the amount of airflow of one or both of said recirculated air and said external air entering said filter assembly.

8. A portable filter assembly for providing filtered air to an enclosed space for a human occupant, said filter assembly comprising:

a housing having:
 an exhaust port connected to the enclosed space,
 an internal air intake port for connecting to the enclosed space, and
 an external air intake port for connecting outside of the enclosed space;
means for providing a partial vacuum to both of said air intake ports, said means including a motor; and
a HEPA filter within said housing, wherein
said assembly is arranged such that said assembly simultaneously filters recirculated air drawn from said enclosed space via said internal air intake port and also filters external air from the outside of the enclosed space via said external air intake port, and wherein
said filtered air is provided to the enclosed space via said exhaust port, and wherein
the motor pulls a stream of air through said air intake ports and the HEPA filter and pushes the stream of air through the exhaust port, said stream of air providing a positive pressure to the enclosed space relative to the outside of the enclosed space, and wherein
the motor is located downstream of the HEPA filter, and further wherein
said assembly is portable such that said assembly can be moved into and out of said enclosed space by an individual.

9. The portable filter assembly of claim 8, wherein the exhaust and air intake ports are integral to the housing.

10. The portable filter assembly of claim 8, wherein the housing further comprises a removable lid wherein the exhaust port is integral to the lid.

11. The portable filter assembly of claim 8, further comprising another filter for pre-filtering one or both of the recirculated air and the external air before being filtered by said HEPA filter.

12. The portable filter assembly of claim 8, a further comprising a lip circumferentially formed around an upper portion of the housing.

13. The portable filter assembly of claim 12, wherein a filter chamber and an exhaust chamber are formed by contact between the top of the filter and the lip.

14. The portable filter assembly of claim 8, further comprising a baffle for controlling the amount of airflow of one or both of said recirculated air and said external air entering said filter assembly.

15. A portable filter assembly for providing filtered air to an enclosed space for a human occupant, said filter assembly comprising:
 a housing having:
  an exhaust port for connecting to the enclosed space,
  an internal air intake port for connecting to the enclosed space,
  a first filter chamber in fluid communication with the internal air intake port;
  an external air intake port for connecting outside of the enclosed space; and
  a second filter chamber in fluid communication with the external air intake port;
 means for providing a partial vacuum to one or both of said air intake ports, said means including a motor;
 a pre-filter; and
 a HEPA filter within said housing located between the filter chambers, wherein
 said assembly is adapted for simultaneously filtering recirculated air drawn from said enclosed space via said internal air intake port and filtering external air from the outside of the enclosed space via said external air intake port, and wherein
 said filtered air is provided to the enclosed space via said exhaust port, and wherein
 the motor pulls a stream of air through said air intake ports, the prefilter and the HEPA filter and pushes the stream of air through the exhaust port, said stream of air providing a positive pressure to the enclosed space relative to the outside of the enclosed space, and wherein,
 the motor is located downstream of the HEPA filter, and the HEPA filter is located downstream of the pre-filter, and further wherein
 said assembly is portable such that said assembly can be moved into and out of said enclosed space by an individual.

16. The portable filter assembly of claim 15, wherein said exhaust and said air intake ports are integral to said housing.

17. The portable filter assembly of claim 15, wherein the housing further comprises a removable lid, wherein said exhaust port is integral to said lid.

18. The portable filter assembly of claim 15, further comprising another HEPA filter.

19. The portable filter assembly of claim 15, further comprising a baffle for controlling an amount of airflow of one or both of said recirculated air and said external air entering said filter assembly.

20. A portable filter assembly for providing filtered air to an enclosed space for a human occupant, said filter assembly comprising:
 a housing having:
  a partition forming a filter chamber and an exhaust chamber within said housing, said partition having an opening for connecting said filter chamber to said exhaust chamber;
  an exhaust port connecting the exhaust chamber to the enclosed space,
  an internal air intake port connecting the filter chamber to the enclosed space, and
  an external air intake port connecting the filter chamber to the outside of the enclosed space;
 means for providing a partial vacuum within said filter chamber, said means including a motor;
 a pre-filter;
 a purification filter within said filter chamber; wherein
 said assembly is arranged such that said assembly filters recirculated air drawn from said enclosed space via said internal air intake port and filters external air from the outside of the enclosed space via said external air intake port, and wherein
 said filtered air is provided to the enclosed space via said exhaust port, and further wherein
 said motor pulls a stream of air through said air intake ports, the prefilter and the purification filter and pushes the stream of air through the exhaust port, said stream of air providing a positive pressure to the enclosed space relative to the outside of the enclosed space, and wherein
 said motor is located downstream of the purification filter, and the purification filter is located downstream of the prefilter, and wherein
 said assembly is portable such that said assembly can be moved into and out of said enclosed space by an individual.

21. The portable filter assembly of claim 20, wherein said purification filter is a HEPA filter.

* * * * *